United States Patent [19]

Rhein

[11] Patent Number: 5,284,358
[45] Date of Patent: Feb. 8, 1994

[54] AIR BAG ASSEMBLY

[75] Inventor: John F. Rhein, St. Clair, Mich.

[73] Assignee: TRW Vehicle Safety Systems Inc., Lyndhurst, Ohio

[21] Appl. No.: 884,534

[22] Filed: May 15, 1992

[51] Int. Cl.⁵ .......................................... B60R 21/16
[52] U.S. Cl. ............................................. 280/728 A
[58] Field of Search .............. 280/743, 728, 730, 731, 280/732, 736, 728 A, 728 R; 403/336, 335

[56] References Cited

U.S. PATENT DOCUMENTS

| | | |
|---|---|---|
| 4,111,457 | 9/1978 | Kob et al. . |
| 4,842,300 | 6/1989 | Ziomek .................... 280/732 |
| 4,913,461 | 4/1990 | Cuevas . |
| 4,915,410 | 4/1990 | Bachelder . |
| 4,941,678 | 7/1990 | Lauritzen et al. . |

Primary Examiner—Karin L. Tyson
Attorney, Agent, or Firm—Calfee, Halter & Griswold

[57] ABSTRACT

An air bag assembly 10 includes a reaction/coupling structure 12, an air bag subassembly 14 coupled to the reaction coupling structure 12, and an inflator 16 also coupled to the reaction/coupling structure 12. The reaction/coupling structure 12 includes a reaction device 20 and a coupling device 22 which are coupled together in a mated arrangement. The air bag subassembly 14 includes an air bag 24 having a mouth portion 26 which defines a gas inlet opening The inflator 16 is positioned to supply inflation fluid to the air bag 24 through the inlet opening. The mouth portion 26 of the air bag 24 is trapped between the reaction device 20 and the coupling device 22 thereby coupling the air bag subassembly 14 to the reaction/coupling structure 12. The inflator 16 is coupled to the reaction/coupling structure 12 in such a manner that the reaction device 20 and the coupling device 22 are locked in the mated arrangement.

22 Claims, 12 Drawing Sheets

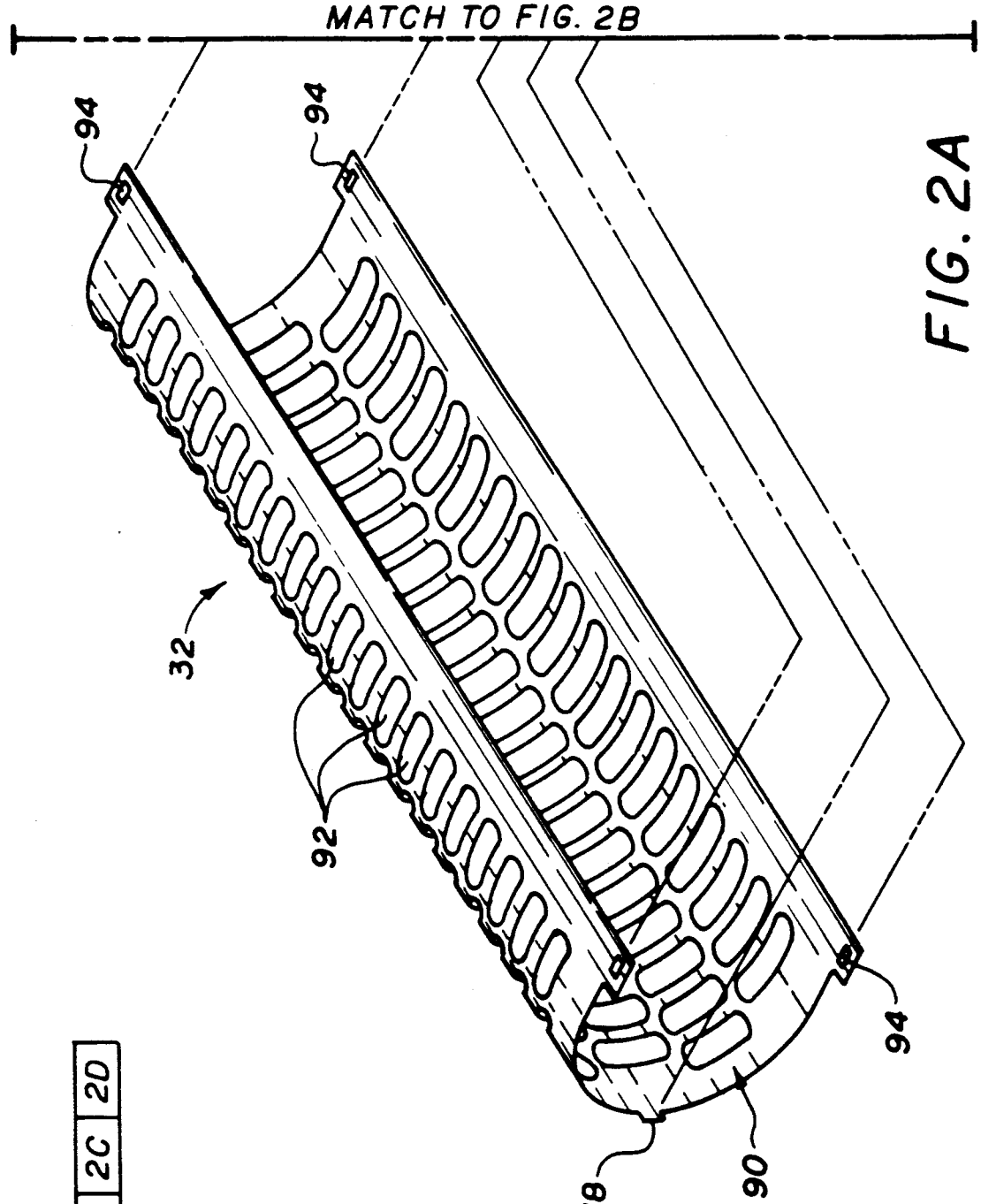

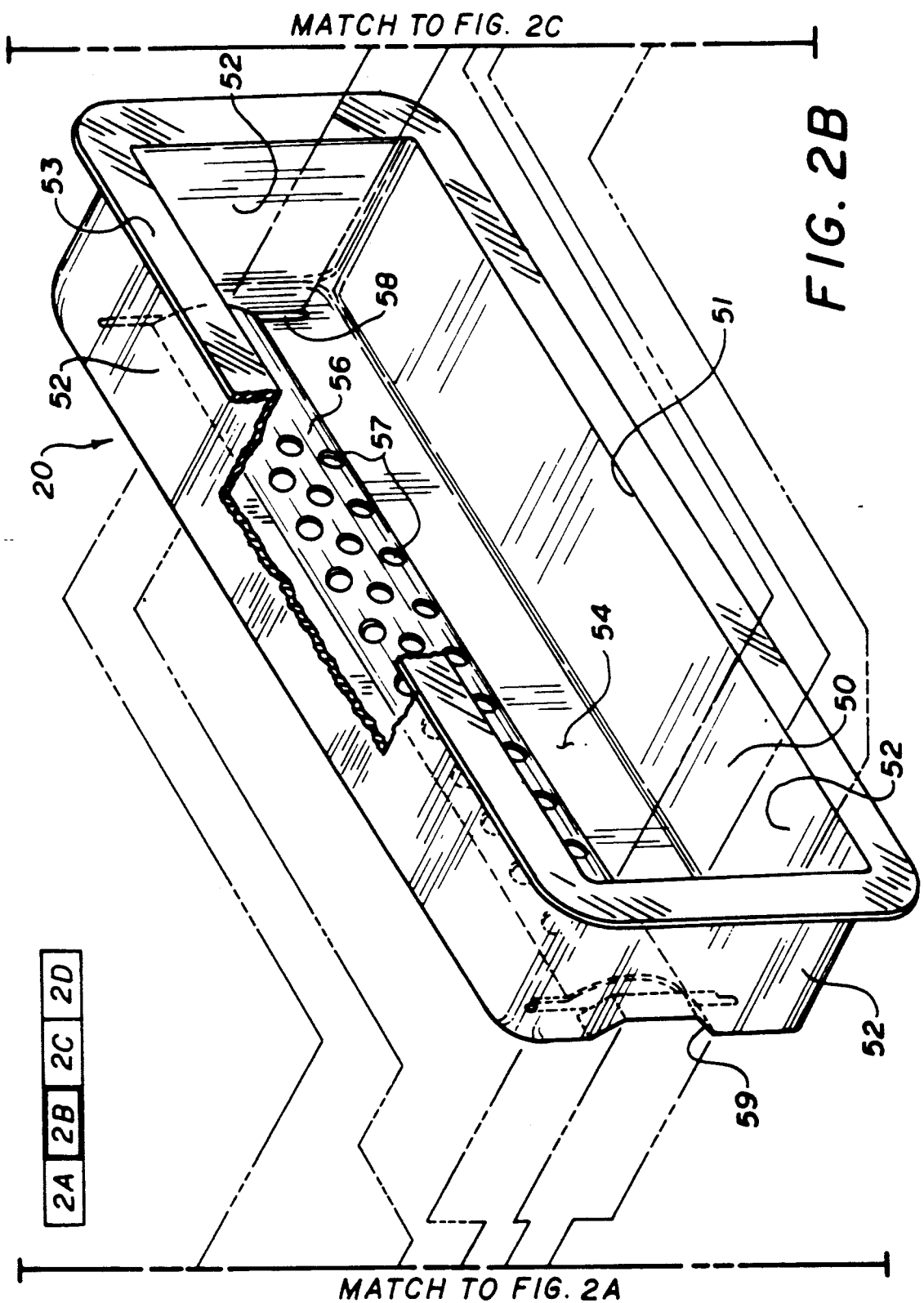

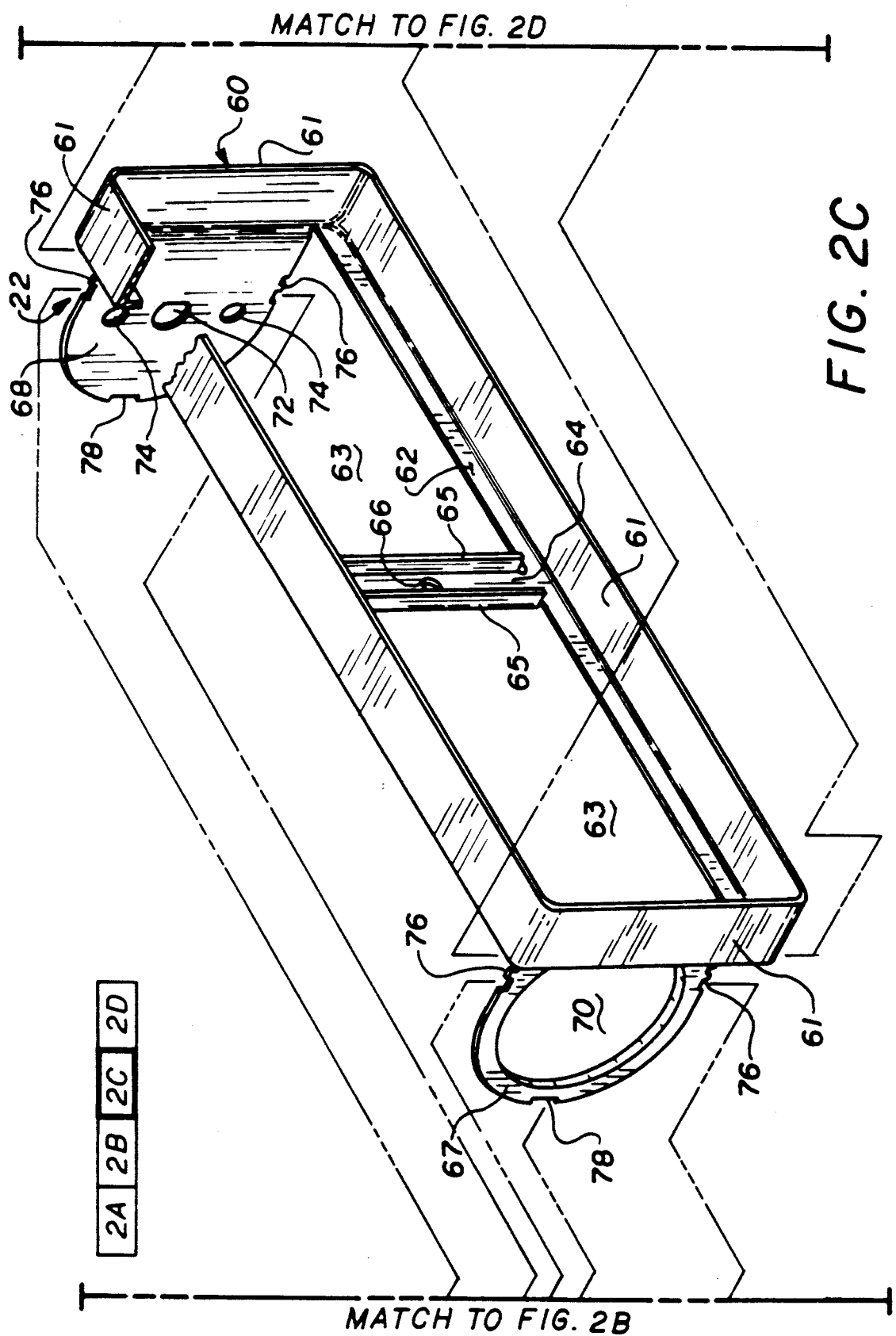

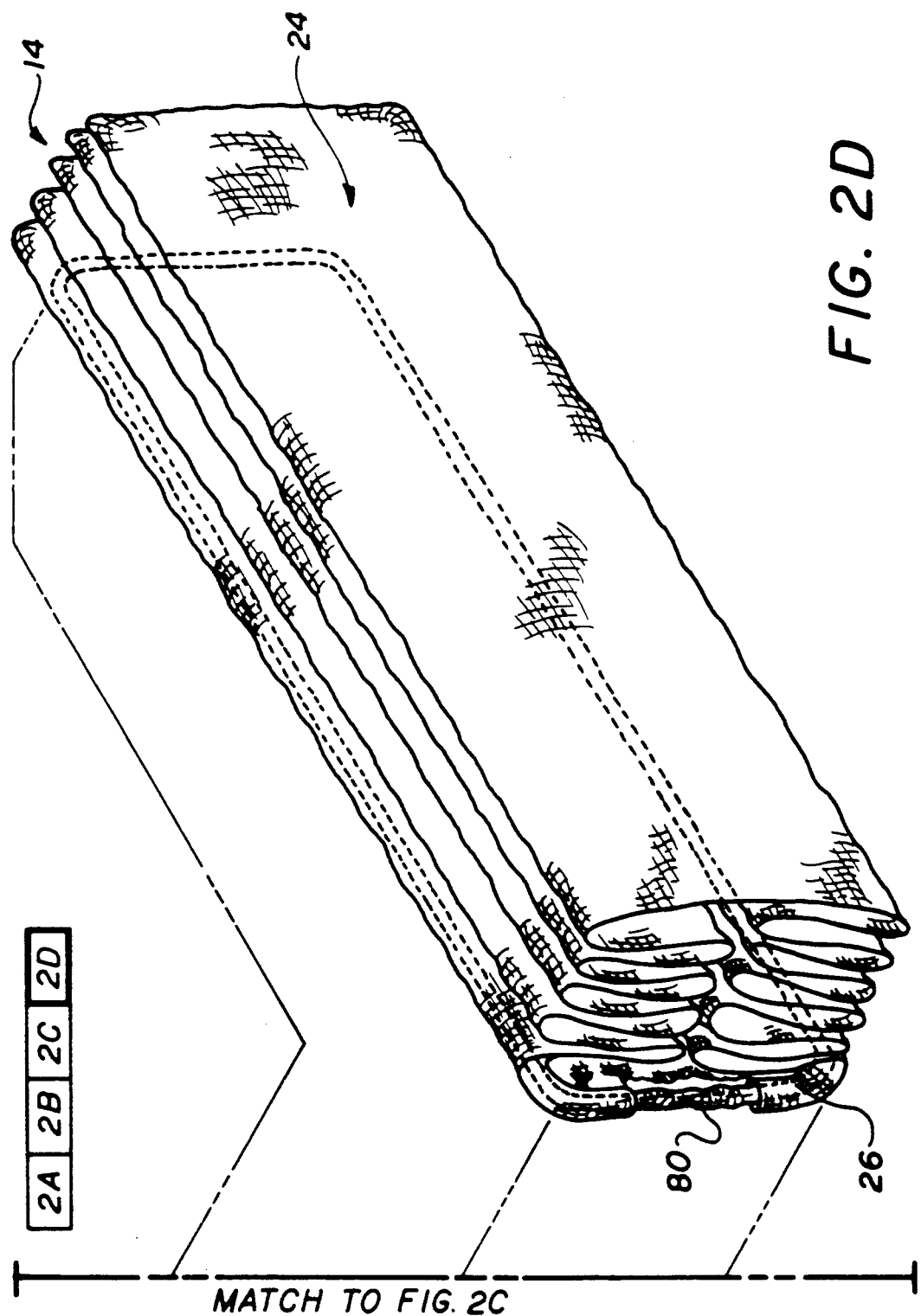

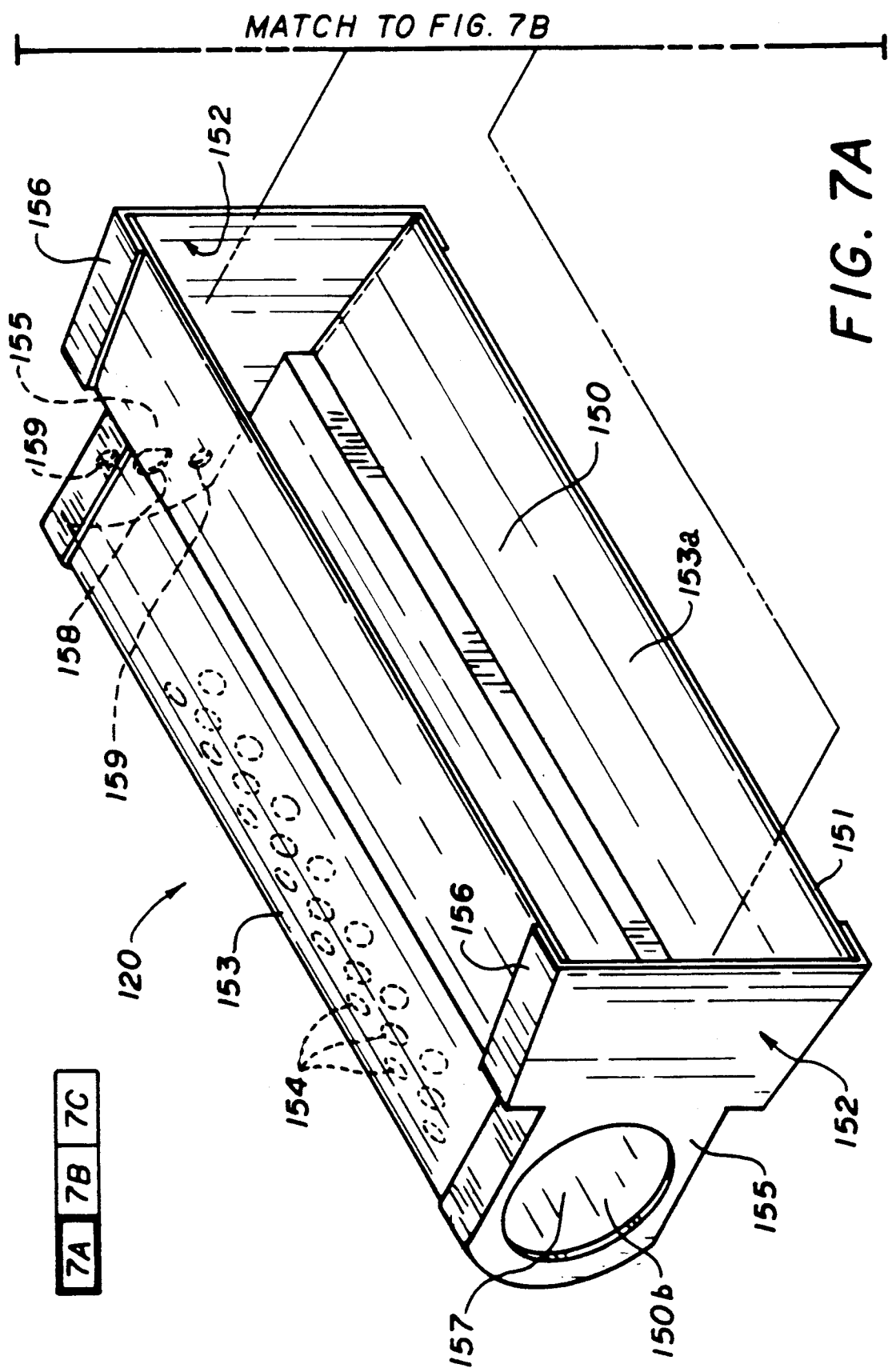

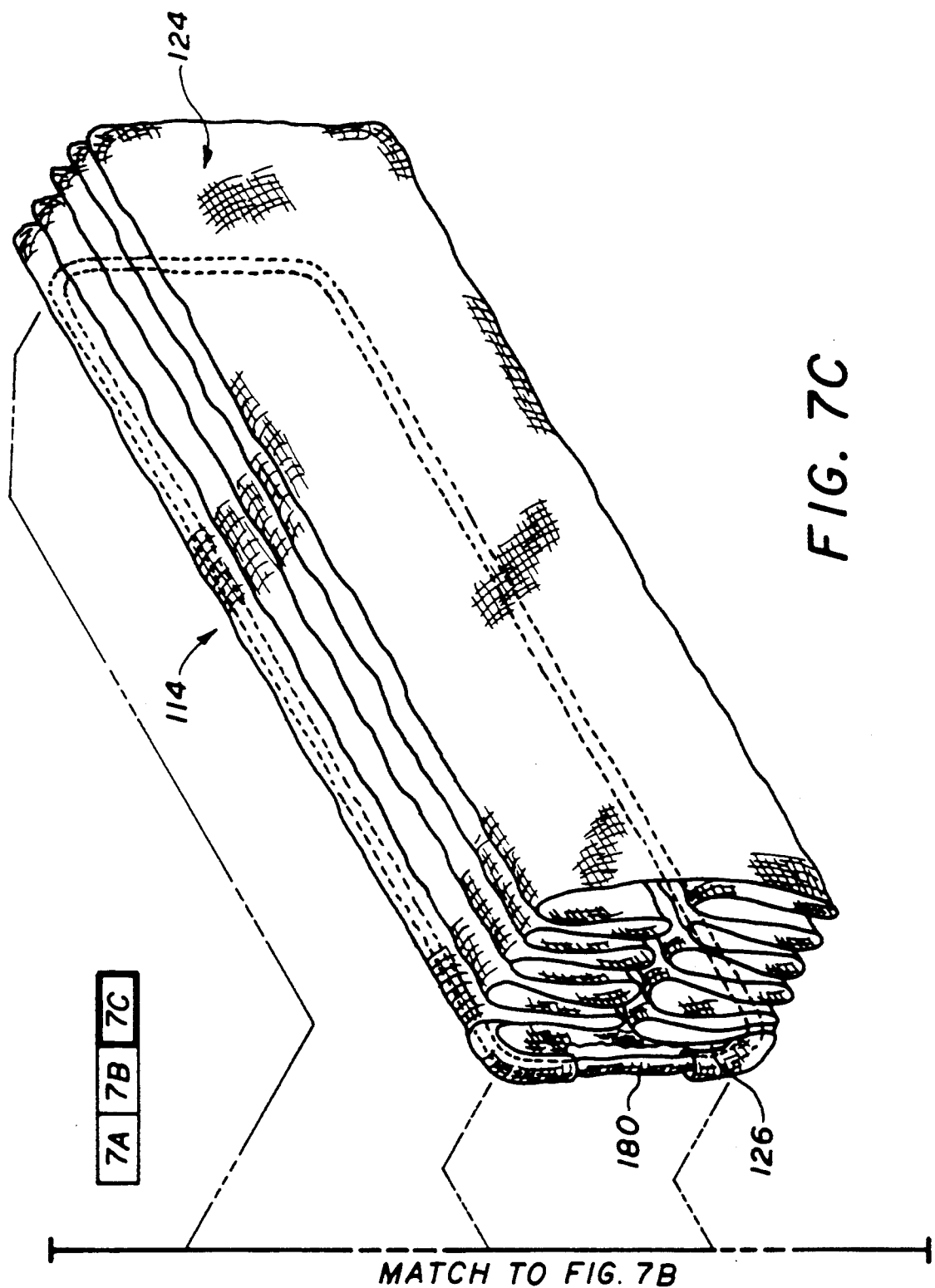

AIR BAG ASSEMBLY

FIELD OF THE INVENTION

This invention relates generally to an air bag assembly and more particularly to an air bag assembly which eliminates the need for a plurality of sets of fasteners by using an inflator as a pin or a locking member to hold the other components of the air bag assembly together.

BACKGROUND OF THE INVENTION

A vehicle air bag assembly commonly includes a reaction device, an air bag coupled to the reaction device, and an inflator also coupled to the reaction device. The air bag includes a mouth portion which defines a gas inlet opening. The inflator is positioned to supply inflation fluid to the gas inlet opening to inflate the air bag. The air bag assembly will usually also include a cover which is coupled to the reaction device and which, together with the reaction device, forms a receptacle for the air bag.

An air bag assembly is generally coupled with a structural part of the vehicle via the reaction device. In the case of a passenger side air bag assembly, for example, the reaction device may be coupled with the support structure for the vehicle instrument panel or dashboard, and the cover may form a part of the instrument panel. When coupled with a vehicle, the air bag assembly operates to deploy the air bag at the onset of a vehicle collision. Specifically, at the onset of a collision, the inflator supplies inflation fluid to the air bag through its gas inlet opening. The cover is designed so that when the air bag begins to inflate, an opening will be created for the expanding air bag. The inflation fluid simultaneously forces the air bag through the opening in the cover and inflates the air bag.

In a typical assembly process, the air bag is coupled to the reaction device with a set of fastening elements (such as bolts or rivets). The inflator is coupled to the reaction device with an additional set of fastening elements. The cover is then coupled to the reaction device using a further set of fastening elements. Generally, the more separate fastening elements incorporated into an air bag assembly, the more complicated will be the assembly technique. For this reason, applicant believes a need remains for an air bag assembly which simplifies assembly techniques, particularly by minimizing the number of separate fastening elements.

SUMMARY OF THE INVENTION

The present invention provides an air bag assembly which simplifies assembly techniques by minimizing the number of fastening elements. More particularly, the present invention provides an air bag assembly comprising a reaction/coupling structure, an air bag subassembly coupled to the reaction/coupling structure, and an inflator also coupled to the reaction/coupling structure. The reaction/coupling structure includes a reaction device and a coupling device which are coupled together in a mated arrangement. The air bag subassembly includes an air bag having a mouth portion which defines a gas inlet opening. The inflator is positioned to supply inflation fluid to the air bag through the gas inlet opening. The mouth portion of the air bag is trapped between the reaction device and the coupling device, thereby coupling the air bag subassembly to the reaction/coupling structure. The inflator is coupled to the reaction/coupling structure in such a manner that the reaction device and the coupling device are locked in the mated arrangement.

Preferably, the reaction device comprises a set of walls which together define a cavity and a deployment opening. The coupling device is sized and shaped to be inserted through the deployment opening and into the cavity. Also preferably, the inflator comprises a cylindrical housing having an axial dimension substantially greater than the radial dimension.

The air bag assembly may further comprise a cover which is coupled to the reaction/coupling structure and which, together with the reaction device, forms a receptacle for the air bag. The cover may include a coupling portion captured between the reaction device and the coupling device thereby to couple the cover to the reaction/coupling structure. Alternatively, the cover may be directly coupled to the reaction device with a set of fasteners. The air bag assembly may further comprise a heat shield which is coupled to the reaction/coupling structure and which dissipates heat transferred by the inflator during deployment of the air bag assembly.

The present invention also provides a method of making an air bag assembly. The method includes the steps of: positioning the mouth of the air bag around the coupling device; thereafter coupling the reaction device and the coupling device together in a mated arrangement; and coupling the inflator to the reaction/coupling structure in such a manner that the reaction device and the coupling device are locked in the mated arrangement. In this manner, the mouth portion of the air bag is captured between the reaction device and the coupling device thereby coupling the air bag subassembly to the reaction/coupling structure without the use of separate fastening elements.

These and other features of the invention are fully described and particularly pointed out in the claims. The following descriptive annexed drawings set forth in detail certain illustrative embodiments. However these embodiments are indicative of but a few of the various ways in which the principles of the invention may be employed.

BRIEF DESCRIPTION OF THE DRAWINGS

In the annexed drawings:

FIGS. 2A-2D collectively form an exploded perspective view of certain components of the air bag assembly;

FIGS. 7A-7C collectively form an exploded perspective view of certain components of the air bag assembly of FIG. 6.

DETAILED DESCRIPTION

Figure 1:
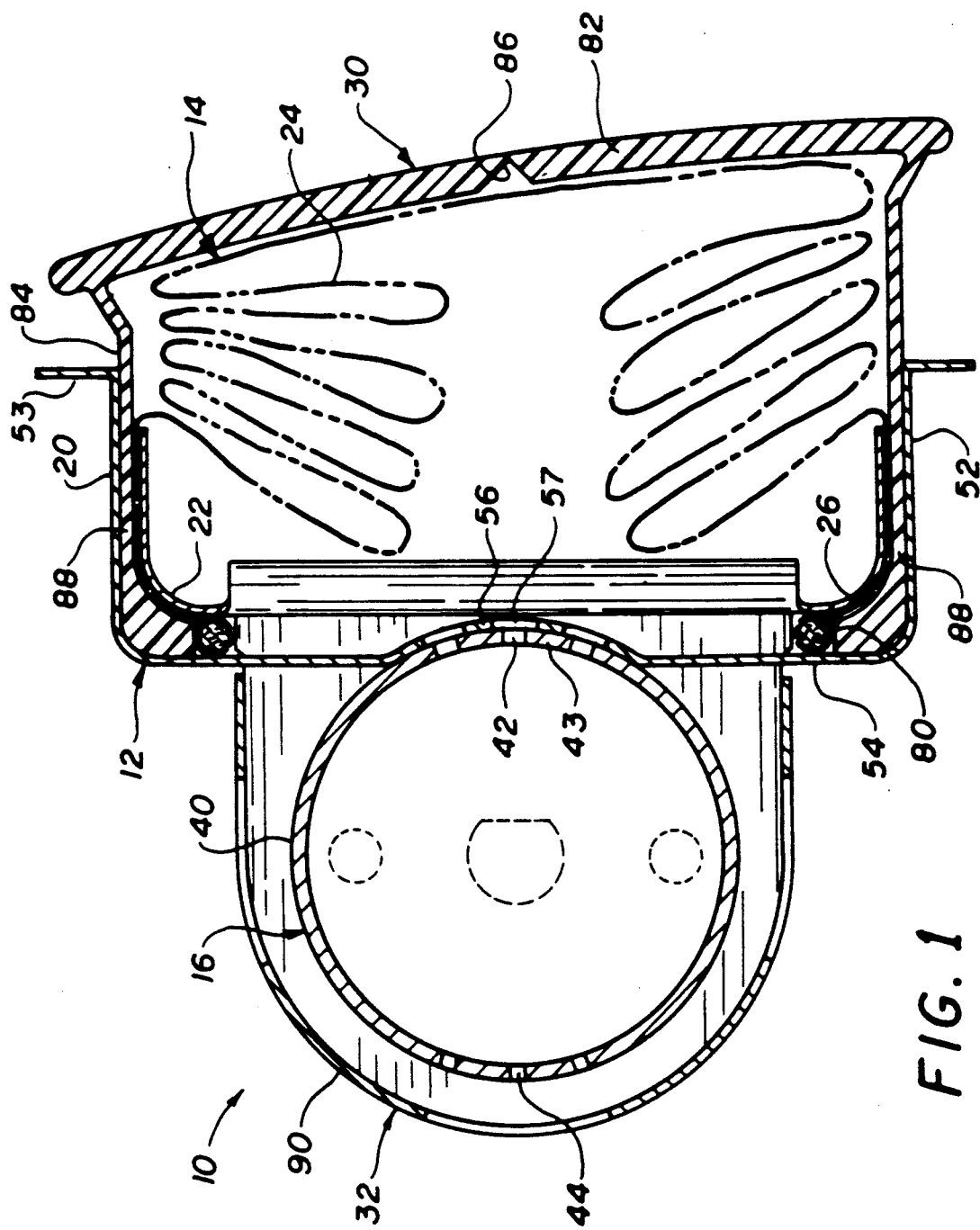
FIG. 1 is a sectional view of one embodiment of an air bag assembly according to the present invention, the air bag assembly including a reaction/coupling structure, an air bag subassembly, an inflator, a cover, and a heat shield.

Referring now to the drawings in detail, FIG. 1 shows an air bag assembly 10 according to the present invention. The air bag assembly 10 includes a reaction/-coupling structure 12, an air bag subassembly 14 coupled to the structure 12, and an inflator 16 also coupled to the structure 12. The reaction/coupling structure 12 includes a reaction device 20 and a separate coupling device 22 coupled to the reaction device 20 in a mated arrangement. The air bag subassembly 14 includes an air bag 24 having a mouth portion 26 which defines a gas inlet opening. The inflator 16 is positioned to supply inflation fluid to the air bag 24 through the inlet opening to inflate the air bag 24.

The mouth portion 26 of the air bag 24 is captured between the reaction device 20 and the coupling device 22 to couple the air bag subassembly 14 to the reaction/-coupling structure 12. The inflator 16 is coupled to the reaction/coupling structure 12 in such a manner that the reaction device 20 and the coupling device 22 are locked in the mated arrangement. In this manner, the air bag assembly 10 requires a minimum number of separate fastening elements, and assembly techniques are simplified.

The air bag assembly 10 further comprises a cover 30 and a heat shield 32. The cover 30 is coupled to the reaction/coupling structure 12 and, together with the reaction device 20, forms a receptacle for the air bag 24. The heat shield 32 is also coupled to the reaction/coupling structure 12 and functions to shield the vehicle from heat generated by the inflator 16 during deployment of the air bag assembly 10.

Figure 4:
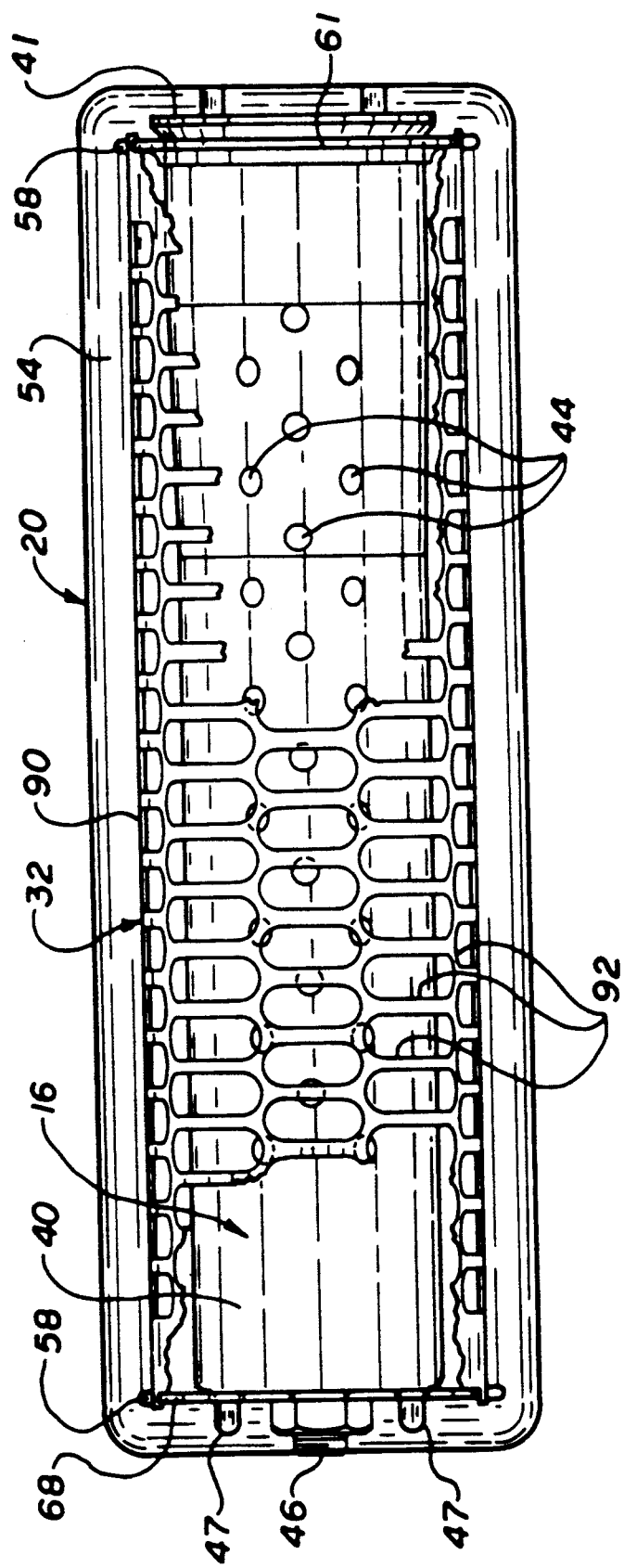
FIG. 4 is a back view of the air bag assembly of FIG. 1.

In the illustrated embodiment, the inflator 16 includes a cylindrical housing 40 enclosing an inflation fluid source (not shown). ("Cylindrical" in this context refers to a housing having an axial dimension which is substantially greater than its radial dimension.) A radial flange 41 (See FIG. 4) surrounds one axial end of the cylindrical housing 40. Primary fluid discharge orifices 42 are located on a front or primary-discharging portion 43 of the housing 40 and secondary fluid discharge orifices 44 are located on a diametrically opposite portion of the cylindrical housing 40. The fluid source may constitute a chemical mixture (not shown) which, when ignited, generates large quantities of an inert gas such as nitrogen. During deployment of the air bag assembly 10, inflation fluid will be released from the housing 40 through the primary discharge orifices 42 to inflate the air bag 24. In the event that the pressure within the housing 40 reaches a predetermined level during this deployment, the secondary discharge orifices 44 will release, or vent, inflation fluid from the housing 40.

Figure 3:
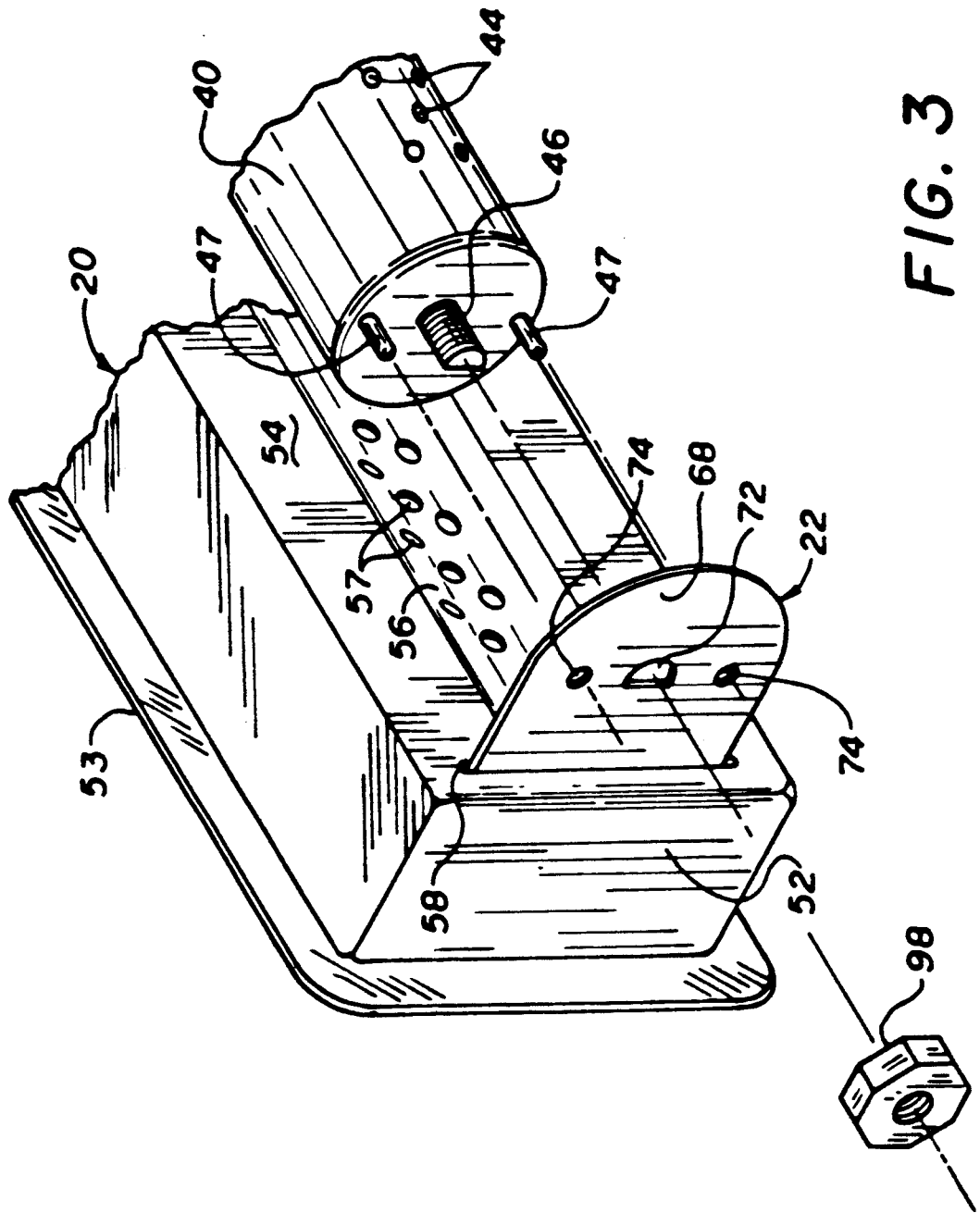
FIG. 3 is an exploded perspective view of the inflator being coupled to the reaction/coupling structure.

The inflator 16 additionally includes coupling members for coupling it to the reaction/coupling structure 12. In the illustrated embodiment, the coupling members include a projection 46 and a pair of projections 47 (See FIG. 3), all of which extend axially from the "non-flanged" end of the cylindrical housing 40. The projection 46 is centrally located, is externally threaded, and preferably has a non-symmetrical cross-sectional geometry, such as the illustrated "D" shape. The projections 47 are diametrically arranged relative to the central projection 46 and are preferably cylindrical in shape and thus have symmetrical circular cross-sections.

As was indicated above, the reaction/coupling structure 12 comprises a reaction device 20 and a coupling device 22. The reaction device 20 and the coupling device 22 are preferably made of sheet steel, approximately seventeen to nineteen gage in thickness and formed by either a progressive and/or transfer die stamping process. Nonetheless, other materials, such as aluminum or structural plastics, and/or other manufacturing methods may be used to make the reaction device 20 and/or the coupling device 22.

The reaction device 20, which is best shown in FIG. 2B, comprises a set of walls which define a cavity 50 and a deployment opening 51. Specifically, the set of walls includes four adjoining side walls 52 and a rear wall 54 which together form a box-like structure. The front edges of the side walls 52 are turned outward into a peripheral flange 53 which surrounds the deployment opening 51. The peripheral flange 53 may be used to couple the reaction device 20 to a vehicle.

The rear wall 54 includes an inflator-accommodating portion 56 designed to accommodate the front portion 43 of the inflator 16. The inflator-accommodating portion 56 could simply consist of a rectangular opening sized to receive the front portion 43 of the inflator 16. However, in the preferred embodiment, the inflator-accommodating portion 56 comprises a curved impression which conforms to the outer contour of the inflator's front portion 43 and which includes a series of openings 57. In the completed air bag assembly 10, the openings 57 will align with the primary discharge orifices 42 of the inflator 16. The openings 57 in the reaction device 20 are preferably substantially larger in area than the inflator discharge orifices 42 so that exact alignment is not necessary.

The reaction device 20 additionally includes mating slots 58 located in the rear wall 54 adjacent each end of the inflator-accommodating portion 56. As is explained in more detail below, these mating slots 58 receive the mating members of the coupling device 22 to couple the reaction and coupling devices together in a mated arrangement. The reaction device 20 further includes an indentation 59 adjacent one of the mating slots 58 to accommodate the inflator flange 41 in the completed air bag assembly 10.

The coupling device 22, which is best shown in FIG. 2C, comprises a base 60 including four side walls 61 and a rear wall 62. The rear wall 62 has two rectangular openings 63 separated by a reinforcing panel 64. The panel 64 includes a centrally located hole 66 and lips 65 that extend generally parallel to the side walls 61 and perpendicular to the rear wall 62 adjacent the openings 63. The centrally located hole 66 aligns with a central hole in the inflator-accommodating portion 56 of the reaction device 20. As is explained in more detail below, the base 60 of the coupling device 22 is shaped and sized to be inserted through the deployment opening 51 and into the cavity 50 defined by the walls of the reaction device 20.

The coupling device 22 additionally includes mating members designed to be received by the mating slots 58 of the reaction device 20 to couple the devices 20 and 22 together in a mated arrangement. These mating members are also preferably designed to cooperate with the inflator 16 in coupling the inflator 16 to the reaction/-coupling structure 12. In this manner, the inflator 16 may essentially function as a locking pin which locks the reaction device 20 and the coupling device 22 together in a mated arrangement.

In the illustrated embodiment, the mating members of the coupling device 22 comprise roughly U-shape wings 67 and 68 which extend perpendicularly from the rear wall 62 of the base 60. The mating wing 67 includes a large circular opening 70 sufficiently large to receive the cylindrical housing 40 of the inflator 16 while at the same being sufficiently small to prevent insertion of the inflator flange 41. The mating wing 68 includes a central D-shape opening 72 and a pair of circular openings 74 diametrically arranged relative to the central opening 66. The openings 72 and 74 are sized and arranged to receive the inflator coupling members 46 and 47, respectively.

Each of the mating wings 67 and 68 additionally includes attachment members for attaching the heat shield 32 to the reaction/coupling structure 12. In the illustrated embodiment, these attachment members comprise a pair of notch-tab-notch cutouts 76 and a single notch cutout 78 formed on each mating wing 67/68. The notch-tab-notch cutouts 76 are located at opposite ends of the U-shaped wing 67/68 adjacent the rear wall 62 of the base 60. The single notch cutout 78 is located intermediate the cutouts 76, at the least proximate point of the wing 67/68 relative to the base 60.

As was indicated above, the air bag subassembly 14 includes an air bag 24 having a mouth portion 26 which defines a gas inlet. (See FIG. 2D.) The air bag 24 is preferably formed from a fabric such as nylon. The air bag subassembly 14 also preferably includes a retaining member 80 which is joined to the mouth portion 26 in a suitable manner. In the illustrated and preferred manner, the retaining member 80 is securely enclosed within a hem sewn in the mouth portion 26 of the air bag 24. The retaining member 80 may comprise a cord possessing elastic properties or, alternatively, may comprise a non-elastic, but flexible, band.

The cover 30 is preferably made of a material, such as polyvinylchloride, which is typically used to mold vehicle instrument panels. The cover 30 includes a covering portion 82 which forms the front surface of the air bag assembly 10 and a coupling portion 84 which is used to couple the cover 30 to the reaction/coupling device 12. In the illustrated embodiment, the covering portion 82 is roughly rectangular in shape and includes an internal V-shaped recess 86. The V-shaped recess 86 selectively weakens the covering portion 82 at a predetermined location to enable the cover 30 to separate into segments when the air bag 14 is being deployed.

The coupling portion 84 includes flange-like flaps 88 which extend from the four sides of the covering portion 82. The flange-like flaps 88 are substantially hook-shaped in cross-section and sized to be sandwiched between the walls of the reaction device 20 and the coupling device 22 in the completed air bag assembly 10. In this manner, the cover 30 will be coupled to the reaction/coupling structure 12.

The heat shield 32, which is best shown in FIG. 2A, comprises a single piece of sheet steel 90, preferably approximately seventeen to nineteen gage in thickness. The sheet metal is curved to form a U-shaped (in cross-section) cradle for the inflator 16. The heat shield 32 includes a series of perforations 92 for dissipating heat transferred by the inflator 16 during deployment of the air bag assembly 10. This heat will be transferred from the inflator either indirectly by conduction or directly by inflation fluid exiting the secondary discharge orifices 44.

The heat shield 32 additionally includes attachment members which cooperate with the members 76 and 78 of the reaction/coupling structure 12 to attach the heat shield 32 to the reaction/coupling structure 12. In the illustrated embodiment, the heat shield's attachment members include slotted tabs 94 which coordinate with the notch-tab-notch cutouts 76 and single tabs 96 which cooperate with the single-notch cutouts 78. Specifically, the tab of a notch-tab-notch cutout 76 of the reaction/coupling structure 12 is inserted into the slot of a corresponding slotted tab 94. The notch of a single-notch cutout 78 receives a single tab 96.

To assemble the air bag assembly 10, the mouth portion 26 of the air bag 24 is initially positioned around the base 60 of the coupling device 22. If the retaining member 80 constitutes an elastic cord, this positioning may be accomplished by stretching the retaining member and pulling the mouth portion 26 around the coupling device. If the retaining member 80 comprises a non-elastic cord, the base 60 may be inserted into the gas inlet of the air bag 24 and then maneuvered into the proper position. In either case, the flange-like flaps 88 of the cover 30 are similarly positioned around the base 60 of the coupling device 22, over the mouth portion 26 of the air bag 24. As is best seen in FIG. 1, the distal edges of the flaps 88 are located immediately adjacent the retaining member 80 of the air bag subassembly 14.

The coupling device 22 (with the air bag subassembly 14 and cover 30 attached) is then coupled to the reaction device 20 in a mated arrangement. Specifically, the base 60 of the coupling device 22 is inserted through the deployment opening 51 and into the cavity 50 defined by the walls of the reaction device 20. Additionally, the mating wings 67 and 68 of the coupling device 22 are inserted through the mating slots 58 of the reaction device 20. In this mated arrangement, the mouth portion 26 of the air bag 24 and the coupling portion of the cover 30 are captured between the reaction device 20 and the coupling device 22. The air bag subassembly 14 and the cover 30 are thereby coupled to the reaction/coupling structure 12.

When the reaction device 20 and the coupling device 22 are coupled together in the illustrated mated arrangement, the mating wings 67 and 68 project generally perpendicular to and away from the rear wall 54 of the reaction device 20. The inflator 16 is coupled to the reaction/coupling structure 12 in such a manner that the inflator 16 locks the reaction device 20 and the coupling device 22 in the mated arrangement. Specifically, the "non-flanged" end of the inflator housing 40 is inserted through the circular opening 70 in the mating wing 67. As was explained briefly above, this opening 70 is sized to receive the inflator housing 40, but not the flange 41.

As the inflator 16 is inserted through the opening 70, the "non-flanged" end will approach the mating wing 68. (See FIG. 3.) When the inflator 16 is completely inserted, the flange 41 will abut the mating wing 67, the projections 46 and 47 will be inserted through the openings 72 and 74 in the mating wing 68, and the front portion 43 of the inflator 16 will be positioned within the inflator-accommodating portion 56 of the reaction device 20. The non-symmetrical "D" shaped geometry of the projection 46 and the opening 72 ensures that the inflator 16 is properly oriented relative to the reaction/coupling structure 12. A threaded fastening element, such as the illustrated nut 98, may then be used to lock the inflator 16 in this completely inserted position. In this manner, the inflator 16 is coupled to the reaction/coupling structure 12, and the reaction device 20 and the coupling device 22 are locked in the mated arrangement.

The heat shield 32 may then be attached to the reaction/coupling structure 12 by cooperation between the attachment members on the mating wings 67 and 68 and the attachment members on the heat shield 32. Alternatively, the heat shield 32 may be attached prior to insertion of the inflator 16. This latter option may be desirable if manufacturing concerns dictate that the inflator 16 must be incorporated into the air bag assembly 10 at a later stage or different location than the other components of the assembly. A further option is initially to use a "dummy inflator" (i.e., a structure which is shaped like the inflator 16 but which does not contain a fluid source) and subsequently to replace the dummy inflator with a live inflator.

Figure 5:
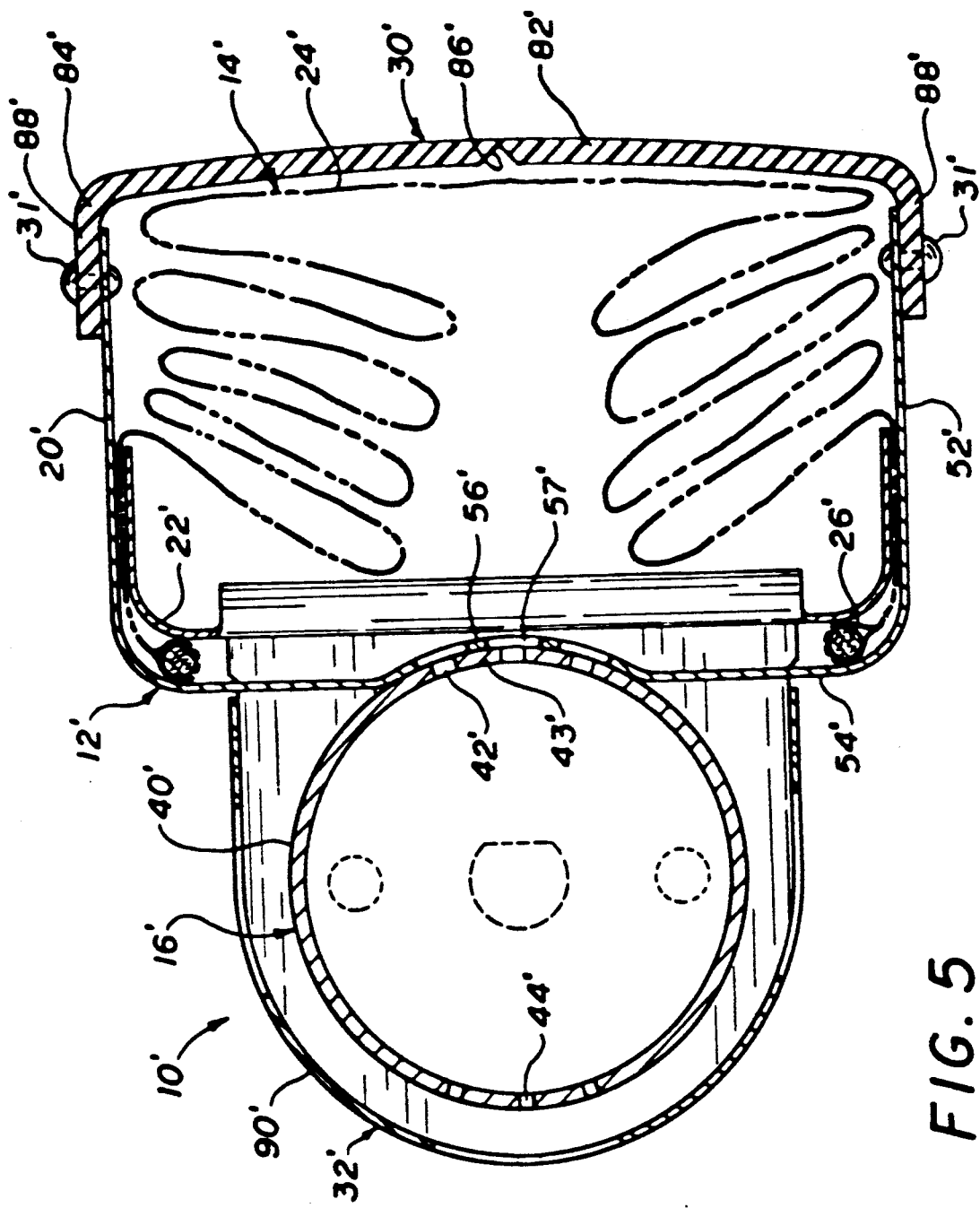
FIG. 5 is a sectional view of a modified form of the air bag assembly of FIG. 1.

Referring now additionally to FIG. 5, a modified form 10' of the air bag assembly 10 is shown. The air bag assembly 10' is similar to the air bag assembly 10 in many ways. Accordingly, like reference numerals will be used to identify analogous components, with the components of the air bag assembly 10' being followed by a prime (') suffix. However, in the air bag assembly 10', the reaction device 20' does not include the peripheral flange 53 and other attachment members (not shown) would be used to couple the reaction device 20' to the vehicle. Additionally, the coupling portion 84' of the cover 30' constitutes substantially small flanges 88' (as compared to the "flaps" of cover 30) which are directly coupled to the reaction device 20', such as with the illustrated fastening elements 31'. Thus, only the mouth portion 26' of the air bag 24' is captured between the walls of the reaction device 20' and the coupling device 22' in the air bag assembly 10'.

To assemble the air bag assembly 10', the mouth portion 26' of the air bag 24' is initially positioned around the base 60' of the coupling device 22'. The base 60' of the coupling device 22' is inserted through the deployment opening and into the cavity defined by the walls of the reaction device 20'. Additionally, the mating flanges 67' and 68' of the coupling device 22' are inserted through the mating slots 58' of the reaction device 20'. In this mated arrangement, the mouth portion 26' of the air bag 24' is captured between the reaction device 20' and the coupling device 22'. The inflator 16' is then coupled to the reaction/coupling structure 12' in the manner described above so that the reaction device 20' and the coupling device 22' are locked in the mated arrangement. Before or after the coupling of the inflator 16' to the reaction/coupling structure 12', the cover 30' and the heat shield 32' may be coupled to the reaction device 20' in a suitable manner.

Figure 6:
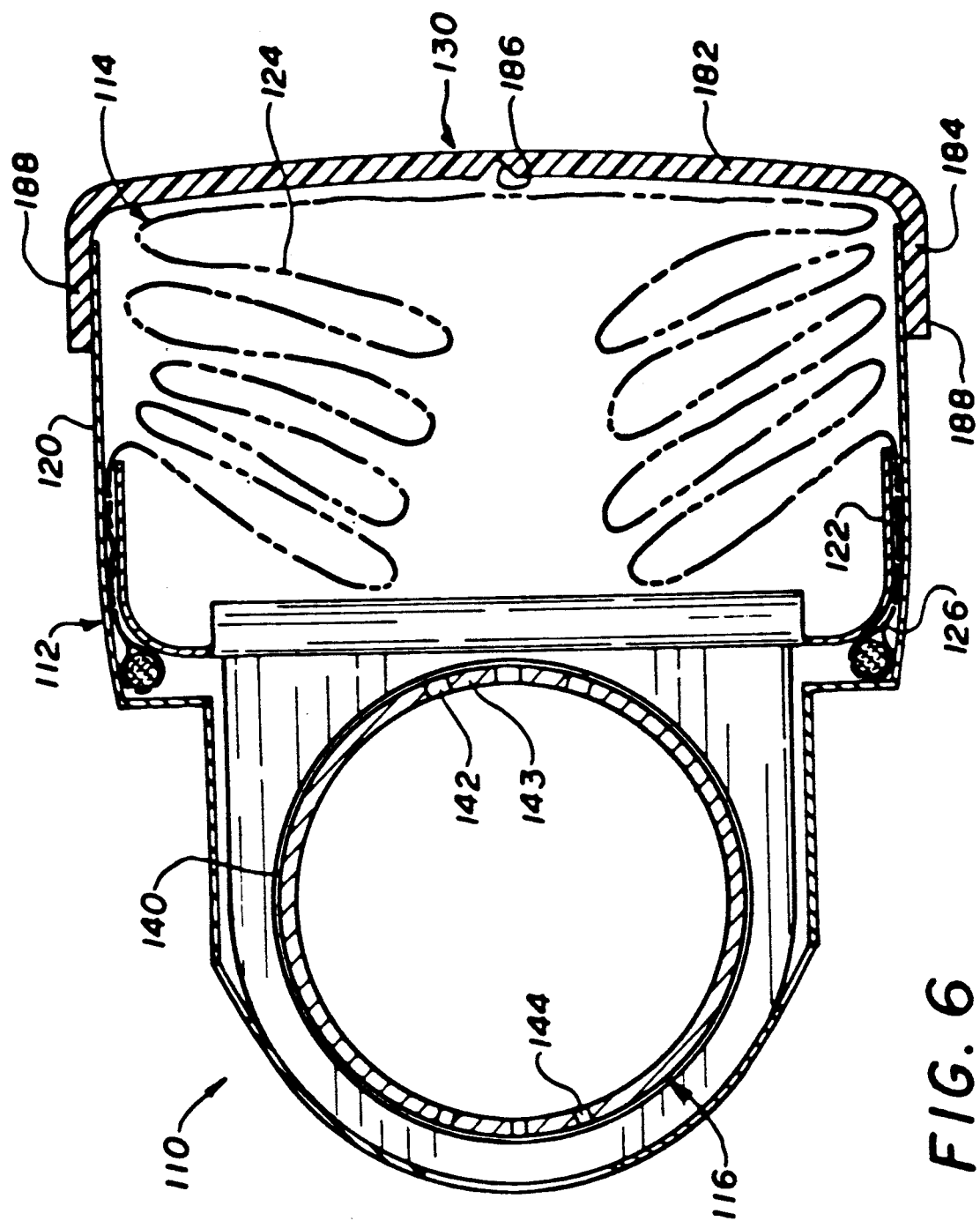
FIG. 6 is a sectional view of an air bag assembly according to another embodiment of the present invention, this air bag assembly including a reaction/coupling structure, an air bag subassembly, an inflator, and a cover.

Referring now further to FIGS. 6 and 7, another air bag assembly 110 according to the present invention includes a reaction/coupling structure 112, an air bag subassembly 114, and an inflator 116. The reaction/coupling structure 112 includes a reaction device 120 and a separate coupling device 122 coupled to the reaction device 120 in a mated arrangement. The air bag subassembly 114 includes an air bag 124 having a mouth portion 126 defining a gas inlet opening. The inflator 116 is positioned to supply inflation fluid to the air bag 124 through the inlet opening to inflate the air bag 124.

The mouth portion 126 of the air bag 124 is trapped between the reaction device 120 and the coupling device 122 to couple the air bag subassembly 114 to the reaction/coupling structure 112. The inflator 116 is coupled to the reaction/coupling structure 112 in such a manner that the reaction device 120 and the coupling device 122 are locked in the mated arrangement. In this manner, the air bag assembly 110 also requires a minimum number of fastening elements, and assembly techniques are simplified.

The air bag assembly 110 further comprises a cover 130 which is coupled to the reaction/coupling structure 112 and which, together with the reaction device 120, forms a receptacle for the air bag 124. However, the air bag assembly 110 does not include a separate heat shield. Instead, the design of the reaction device 120 allows it to function to shield the vehicle from heat transferred by the inflator 116 during deployment of the air bag assembly 110.

The inflator 116 is identical to the inflator 16 discussed above and thus includes a cylindrical housing 140, primary discharge orifices 142, and secondary discharge orifices 144. Additionally, although not expressly shown in the drawings, the inflator 116 includes a flange, a D-shaped (in cross-section) projection, and a pair of cylindrical projections for coupling the inflator 116 to the reaction/coupling structure 112.

The reaction device 120, which is best shown in FIG. 7A, comprises a set of walls which define a cavity 150 and a deployment opening 151. Specifically, the set of walls includes a pair of side walls 152 and a connecting wall 153 which together form a trough-like structure. The connecting wall 153 is U-shaped in cross-section and includes a front portion 153a which terminates at the deployment opening 151, and a rear portion 153b which forms a cradle for the inflator 116.

The rear portion 153b includes a series of openings 154 for dissipating heat transferred by the inflator 116. In this manner, the reaction device 120 also functions as a heat shield for the air bag assembly 110. The rear portion 150b additionally functions as a mating member which receives complimentary shaped mating members of the coupling device 122 to couple these two devices together in a mated arrangement.

Each of the side walls 152 comprises a U-shaped panel 155 and a peripheral flange 156. The peripheral flanges 156 extend from the panels 155 and join the side walls 152 to the connecting wall 153. One of the side walls 152 includes a large circular opening 157 sized large enough to receive the cylindrical housing 140 of the inflator 116 while at the same time small enough to prevent insertion of the inflator flange. The other side wall 152 includes a central D-shape opening 158 and a pair of circular openings 159 diametrically arranged relative to the central opening 158.

Figure 7B:
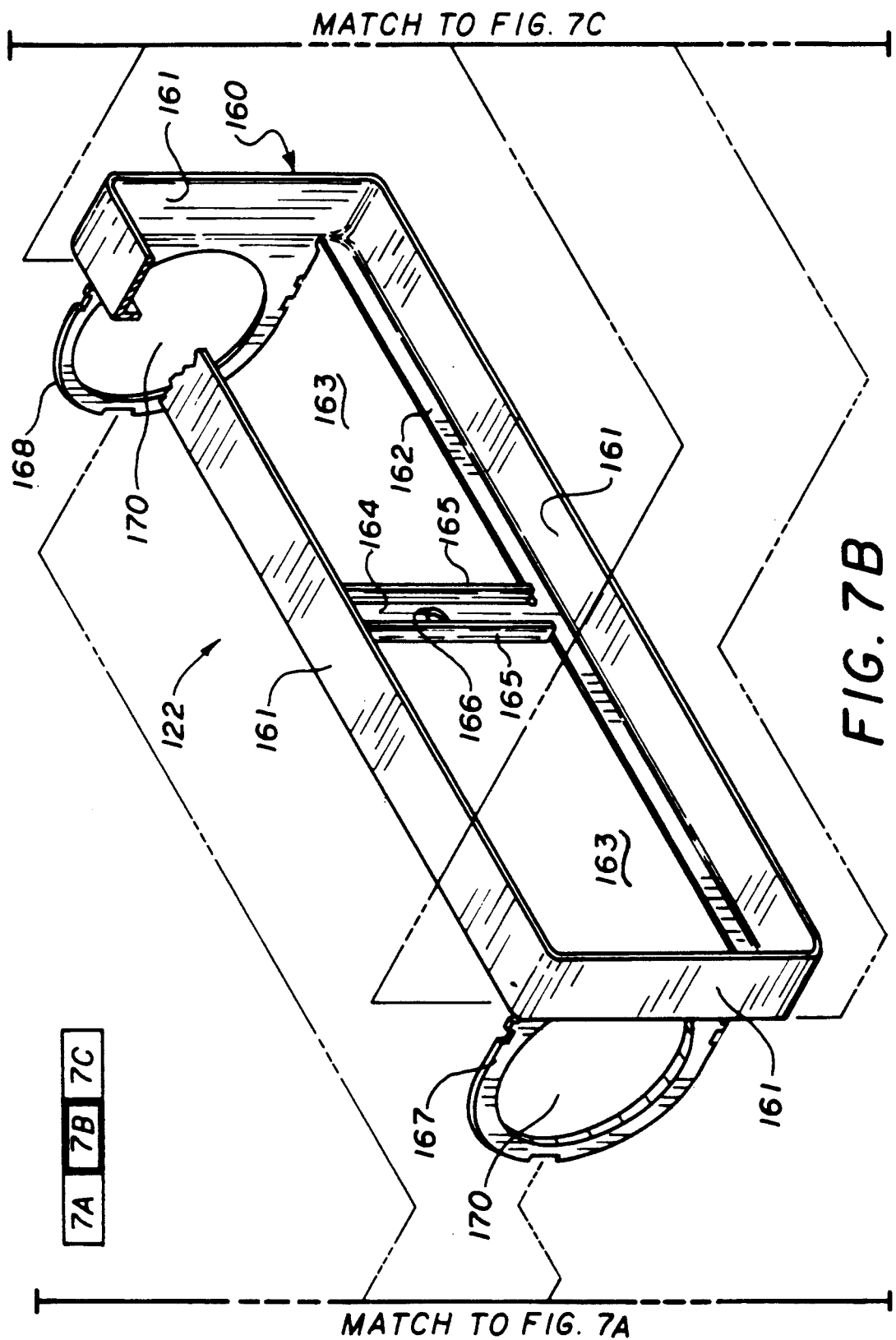

The coupling device 122, which is best shown in FIG. 7B, is similar to the coupling device 22 discussed above. For example, the coupling device 122 comprises a base 160 including four side walls 161 and a rear wall 162. The rear wall 162 includes two rectangular openings 163 separated by a panel 164 which includes lips 165 and a centrally located hole 166. In the completed air bag assembly 110, the centrally located hole 166 aligns with a central primary orifice 142 of the inflator 116. The hole 166 is preferably substantially larger than the discharge orifice 142 whereby exact alignment is not necessary. As is explained in more detail below, the base 160 is shaped and sized to be inserted through the deployment opening 151 and into the cavity 150 formed by the walls of the reaction device 120.

The coupling device 122 additionally includes a pair of mating members designed to be received within the rear portion of the reaction device 120 to couple the devices 20 and 22 together in a mated arrangement. In the preferred embodiment, these mating members comprise roughly U-shape wings 167 and 168 which extend perpendicularly from the base 160. Each of the mating wings 167/168 includes a large circular opening 170 sized large enough to receive the cylindrical housing 140 of the inflator 116.

The air bag subassembly 114 may be essentially identical to the air bag subassembly 14 discussed above. Consequently, in addition to the air bag 124, the air bag subassembly 114 preferably includes a retaining member 180 which is joined to the mouth portion 126 in a suitable manner.

The cover 130 is essentially identical to the cover 30' and includes a covering portion 182 and a coupling portion 184. The covering portion 182 covers the deployment opening 151 to form a closed receptacle for the air bag 124. The portion 182 includes a designed weakness, in the form of a V-shaped recess 186, to release the air bag 124 during deployment of the air bag assembly 110. The coupling portion 184 comprises substantially small flanges 188 (as compared to the "flaps" of the cover 30) which are directly coupled to the reaction device 120. Thus, in the air bag assembly 110, only the mouth portion 126 of the air bag 124 is captured between the reaction device 120 and the coupling device 122.

To assemble the air bag assembly 110, the mouth portion 126 of the air bag 124 is initially positioned around the base 160 of the coupling device 122. The coupling device 122 (and the attached air bag subassembly 14) is then coupled to the reaction device 120 in a mated arrangement. Specifically, the base 160 of the coupling device 122 is inserted into the front portion of the reaction device cavity 150. The mating wings 167 and 168 of the coupling device 122 are inserted into the rear portion of the reaction device cavity 150. In this mated arrangement, the mouth portion 126 of the air bag 124 is captured between the reaction device 120 and the coupling device 122 thereby coupling the air bag subassembly 114 to the reaction/coupling structure 112. When the reaction device 120 and the coupling device 122 are coupled together in such a mated arrangement, the circular openings 170 of the mating wings 167 and 168 are aligned with the circular opening 157 in the side wall 152.

The inflator 116 is then coupled to the reaction/coupling structure 112 in such a manner that the inflator 116 locks the reaction device 120 and the coupling device 122 in the mated arrangement. Specifically, the "non-flanged" end of the inflator housing 140 is inserted through the circular opening 157 in the side wall 152. As the inflator 116 is inserted through the opening 157, its "non-flanged" end will pass through the openings 170 in the mating flanges 167 and 168 and will approach the other side wall 152. When the inflator 116 is completely inserted, its radial flange will abut one of the side walls 152, and its coupling projections will be inserted through the openings 158 and 159 in the other side wall 152. The non-symmetrical geometry of the opening 159 (and the corresponding projection on the inflator) ensures that the inflator 116 is properly oriented relative to the reaction/coupling structure 112. A threaded fastening element may then be used to lock the inflator 116 in this completely inserted position. In this manner, the inflator 116 is coupled to the reaction/coupling structure 112 and the reaction device 120 and the coupling device 122 are locked in the mated arrangement.

The cover 130 may be attached to the reaction/coupling structure 112 either before or after the insertion of the inflator 116. The latter option may be desirable if manufacturing concerns dictate that the inflator 116 must be incorporated into the air bag assembly 110 at a later stage or different location. Alternatively, a "dummy inflator" could be used temporarily and then later replaced with a live inflator.

One may now appreciate that the present invention provides an air bag assembly design which simplifies assembly techniques by minimizing the number of fastening elements. Although the invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the following claims.

What is claimed is:

1. An air bag assembly comprising a reaction/coupling structure, an air bag subassembly coupled to the reaction/coupling structure, and an inflator also coupled to the reaction/coupling structure;

said reaction/coupling structure including a reaction device and a coupling device which are coupled together in a mated arrangement;

said air bag subassembly including an air bag having a mouth portion which defines a gas inlet opening disposed in a plane;

said inflator comprising a cylindrical housing having a radius and an axis substantially longer than said radius, said axis being positioned substantially parallel to the plane of said gas inlet opening;

said inflator being positioned to supply inflation fluid to said air bag through said inlet opening;

said mouth portion of said air bag being trapped between said reaction device and said coupling device thereby coupling said air bag subassembly to said reaction/coupling structure; and said reaction device and said coupling device being locked in said mated arrangement by said inflator.

2. An air bag assembly as set forth in claim 1 further comprising a cover which is coupled to said reaction/coupling structure and which, together with said reaction device, forms a receptacle for said air bag, said cover including a coupling portion captured between said reaction device and said coupling device to thereby couple said cover to said reaction/coupling structure.

3. An air bag assembly as set forth in claim 1 further comprising a cover which is coupled to said reaction/coupling structure and which, together with said reaction device, forms a receptacle for said air bag, said cover including a coupling portion directly coupled to said reaction device.

4. An air bag assembly as set forth in claim 1 further comprising a heat shield which is coupled to the reaction/coupling structure and dissipates heat transferred by the inflator during deployment of the air bag assembly.

5. An air bag assembly as set forth in claim 1 wherein said reaction device comprises a set of walls which together define a cavity and a deployment opening and wherein said coupling device is sized and shaped to be inserted through said deployment opening and into said cavity.

6. An air bag assembly as set forth in claim 5 wherein one of said set of walls includes a front portion which terminates at said deployment opening and a rear portion which cradles said inflator.

7. An air bag assembly as set forth in claim 1 wherein one of said reaction device and said coupling device includes mating slots and the other of said reaction device and said coupling device includes mating members which are received within said mating slots.

8. An air bag assembly comprising a reaction/coupling structure, an air bag subassembly coupled to the reaction/coupling structure, and an inflator also coupled to the reaction/coupling structure;

said reaction/coupling structure including a reaction device and a coupling device which are coupled together in a mated arrangement;

said air bag subassembly including an air bag having a mouth portion which defines a gas inlet opening;

said inflator being positioned to supply inflation fluid to said air bag through said inlet opening;

said mouth portion of said air bag being trapped between said reaction device and said coupling device thereby coupling said air bag subassembly to said reaction/coupling structure;

said reaction device and said coupling device being locked in said mated arrangement by said inflator;

said inflator including a housing enclosing a source of inflation fluid;

said housing having primary discharge orifices which are located on a primary discharging portion of said housing and which release inflation fluid to inflate said air bag;

said reaction device comprising a set of walls which together define a cavity and a deployment opening;

said coupling device being sized and shaped to be inserted through said deployment opening and into said cavity;

at least one of said set of walls of said reaction device including an inflator-accommodating portion which accommodates said primary discharging portion of said inflator; and at least one of said set of walls of said reaction device including mating slots which cooperate with the coupling device to couple the reaction device and coupling device together in said mated arrangement.

9. An air bag assembly as set forth in claim 8 wherein said inflator-accommodating portion comprises a curved impression which conforms to the outer contour of said discharging portion of said inflator.

10. An air bag assembly as set forth in claim 9 wherein said curved impression includes a series of openings which align with said primary discharge orifices.

11. An air bag assembly as set forth in claim 8 wherein said set of walls includes four adjoining walls and a rear wall which together form a box-like structure and wherein said inflator-accommodating portion and said mating slots are located on said rear wall.

12. An air bag assembly as set forth in claim 8 wherein said coupling device comprises a base and a pair of mating members which extend from said base and which are received by said mating slots.

13. An air bag assembly as set forth in claim 12 wherein:

said inflator comprises a housing, which encloses a fluid source, and coupling members, which are attached to said housing;

one of said mating members includes an opening for receiving said housing; and

The other of said mating members includes coupling members which cooperate with said coupling members of said inflator to couple said inflator to said reaction/coupling structure.

14. An air bag assembly as set forth in claim 8 wherein said inflator comprises a cylindrical housing having a radial dimension and an axial dimension substantially greater than said radial dimension.

15. An air bag assembly comprising a reaction/coupling structure, an air bag subassembly coupled to the reaction/coupling structure, and an inflator also coupled to the reaction/coupling structure;

said reaction/coupling structure including a reaction device and a coupling device which are coupled together in a mated arrangement;

said air bag subassembly including an air bag having a mouth portion which defines a gas inlet opening;

said inflator being positioned to supply inflation fluid to said air bag through said inlet opening;

said mouth portion of said air bag being trapped between said reaction device and said coupling device thereby coupling said air bag subassembly to said reaction/coupling structure; and said reaction device and said coupling device being locked in said mated arrangement by said inflator;

said inflator comprising a housing, which encloses a fluid source, and coupling members, which are attached to said housing;

said reaction device comprising a set of walls which together define a cavity and a deployment opening;

said coupling device being sized and shaped to be inserted through said deployment opening and into said cavity;

one of said set of walls including a front portion which terminates at said deployment opening and a rear portion which forms a cradle for said inflator;

a second of said walls including an opening for receiving said housing; and a third of said walls defining coupling members which cooperate with said coupling members of said inflator to couple said inflator to said reaction/coupling structure.

16. An air bag assembly as set forth in claim 15 wherein coupling device comprises a base and a pair of mating members which extend from said base and which are received within said rear portion of said cavity.

17. An air bag assembly as set forth in claim 16 wherein each of said mating members includes an opening which is sized to received said housing of said inflator.

18. An air bag assembly as set forth in claim 1 wherein said air bag subassembly further comprises a retaining member which is joined to said mouth portion of said air bag.

19. An air bag assembly as set forth in claim 18 wherein said retaining member comprises an elastic cord.

20. A method of making an air bag assembly comprising the steps of:

providing a reaction/coupling structure including a reaction device and a coupling device;

providing an air bag subassembly including an air bag having a mouth portion which defines a gas inlet opening;

providing an inflator including a housing enclosing a source of inflation fluid, said cylindrical housing having a radius and an axis substantially longer than said radius;

positioning the mouth portion of the air bag around the coupling device;

coupling the reaction device and the coupling device together in a mated arrangement after the mouth portion of the air bag has been positioned around the coupling device thereby capturing the mouth of the air bag between the reaction device and the coupling device whereby the air bag subassembly is coupled to the reaction/coupling structure; and locking the reaction device and the coupling device in the mated arrangement with said inflator, said locking step including positioning the inflator so said axis is positioned substantially parallel to said gas inlet opening.

21. A method as set forth in claim 20 further comprising the steps of:

providing a cover which is shaped to form, together with the reaction device, a receptacle for the air bag, the cover including a coupling portion shaped and sized to be sandwiched between the reaction device and the coupling device; and positioning the coupling portion of the cover around the coupling device, prior to the coupling device being coupled to the reaction device, whereby when the coupling device is coupled to the reaction device, the coupling portion will be captured between the reaction device and the coupling device thereby coupling the cover to the reaction/coupling structure.

22. A method as set forth in claim 20 wherein said step of providing a reaction/coupling structure includes the step of providing a reaction device defining a cavity and a deployment opening and wherein said step of coupling the reaction device and the coupling device together in a mated arrangement includes the step of inserting said coupling device through said deployment opening and into said cavity.

* * * * *